(12) United States Patent
Patel

(10) Patent No.: US 8,350,402 B2
(45) Date of Patent: Jan. 8, 2013

(54) SYSTEM FOR GENERATING POWER USING FLOW OF WATER

(76) Inventor: Jayantibhai Prabhuram Patel, Ahmedabad (IN)

( * ) Notice: Subject to any disclaimer, the term of this patent is extended or adjusted under 35 U.S.C. 154(b) by 243 days.

(21) Appl. No.: 12/918,806

(22) PCT Filed: Nov. 11, 2008

(86) PCT No.: PCT/IN2008/000764
§ 371 (c)(1),
(2), (4) Date: Aug. 20, 2010

(87) PCT Pub. No.: WO2009/104204
PCT Pub. Date: Aug. 27, 2009

(65) Prior Publication Data
US 2010/0327597 A1 Dec. 30, 2010

(30) Foreign Application Priority Data
Feb. 21, 2008 (IN) .......................... 370/MUM/2008

(51) Int. Cl.
F03B 13/00 (2006.01)
(52) U.S. Cl. ....................................................... 290/54
(58) Field of Classification Search ............... 290/43, 290/54; 415/7; 416/196 R
See application file for complete search history.

(56) References Cited

U.S. PATENT DOCUMENTS

| 1,350,025 A | 8/1920 | Kinback |
| 3,965,679 A | 6/1976 | Paradiso |
| 5,834,853 A | 11/1998 | Ruiz et al. |
| 6,616,403 B1 | 9/2003 | Smith et al. |
| 2008/0136191 A1* | 6/2008 | Baarman et al. ................ 290/54 |

FOREIGN PATENT DOCUMENTS

| DE | 295198 | 12/1915 |
| DE | 19920200 | 11/2000 |
| DE | 20019079 | 2/2001 |
| GB | 01214 | 0/1914 |
| JP | 2005 054764 | 3/2005 |

OTHER PUBLICATIONS

International Search Report and Written Opinion issued in PCT/IN2008/000764, dated Jul. 9, 2010, 18 pages.

* cited by examiner

Primary Examiner — Tho D Ta
(74) Attorney, Agent, or Firm — Klarquist Sparkman, LLP

(57) ABSTRACT

Disclosed is a system for generating electrical power using flowing water in canals, rivers and the like water streams. The system comprising: plurality of circular structures, each having a bore at the center and plurality of elongated arms being fixed on the outer periphery of said structure; plurality of blades being fitted on said plurality of elongated arms; a rotating shaft for rotatably accommodating in space apart relationship said circular structures over outer body of said shaft through said bore; an electrical generator for converting the mechanical energy generated by rotation of said shaft into electrical energy to produce electrical power; and a transmission device for transmitting the mechanical energy generated by rotation of said shaft from shaft to said electrical generator; wherein said circular structures along with blades are kept across the flow of water, the blades of said structure get rotation due to force of flowing water and generate energy which rotates said shaft which in turn generate mechanical energy and finally said mechanical energy is transmitted to electrical generator through transmission device for generating electrical power.

20 Claims, 20 Drawing Sheets

FIG. :3

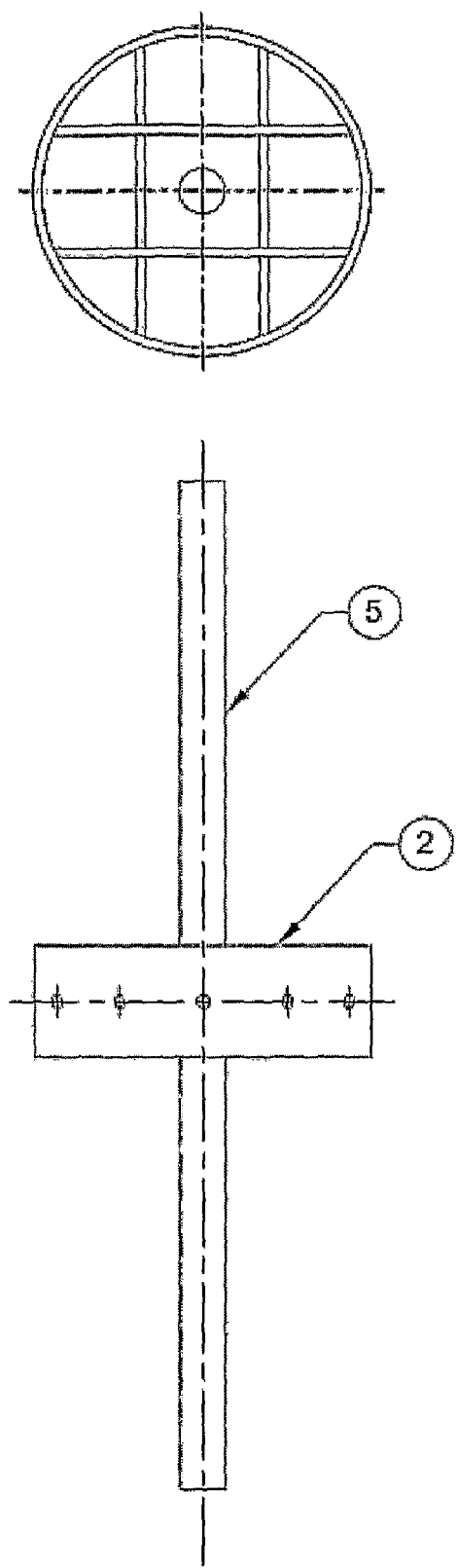
FIG.: 5

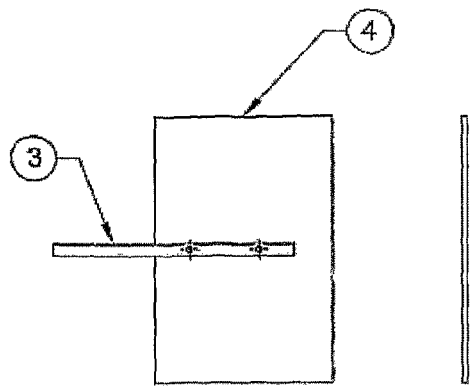
FIG.: 7a
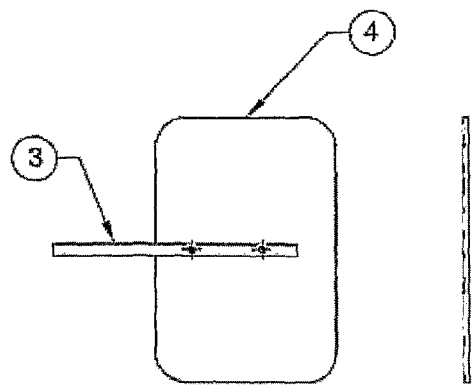
FIG.: 7b
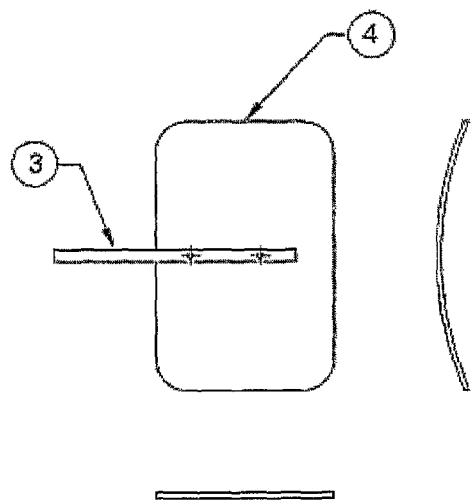
FIG.: 7c
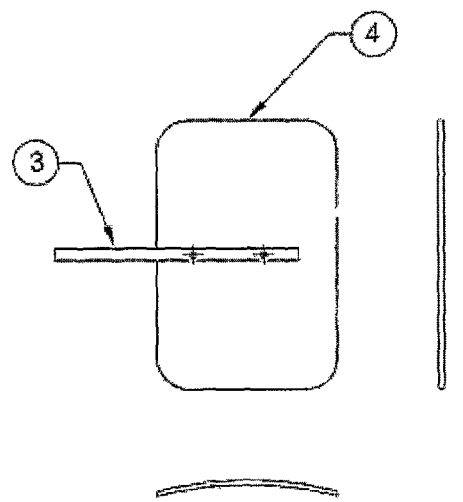
FIG.: 7d

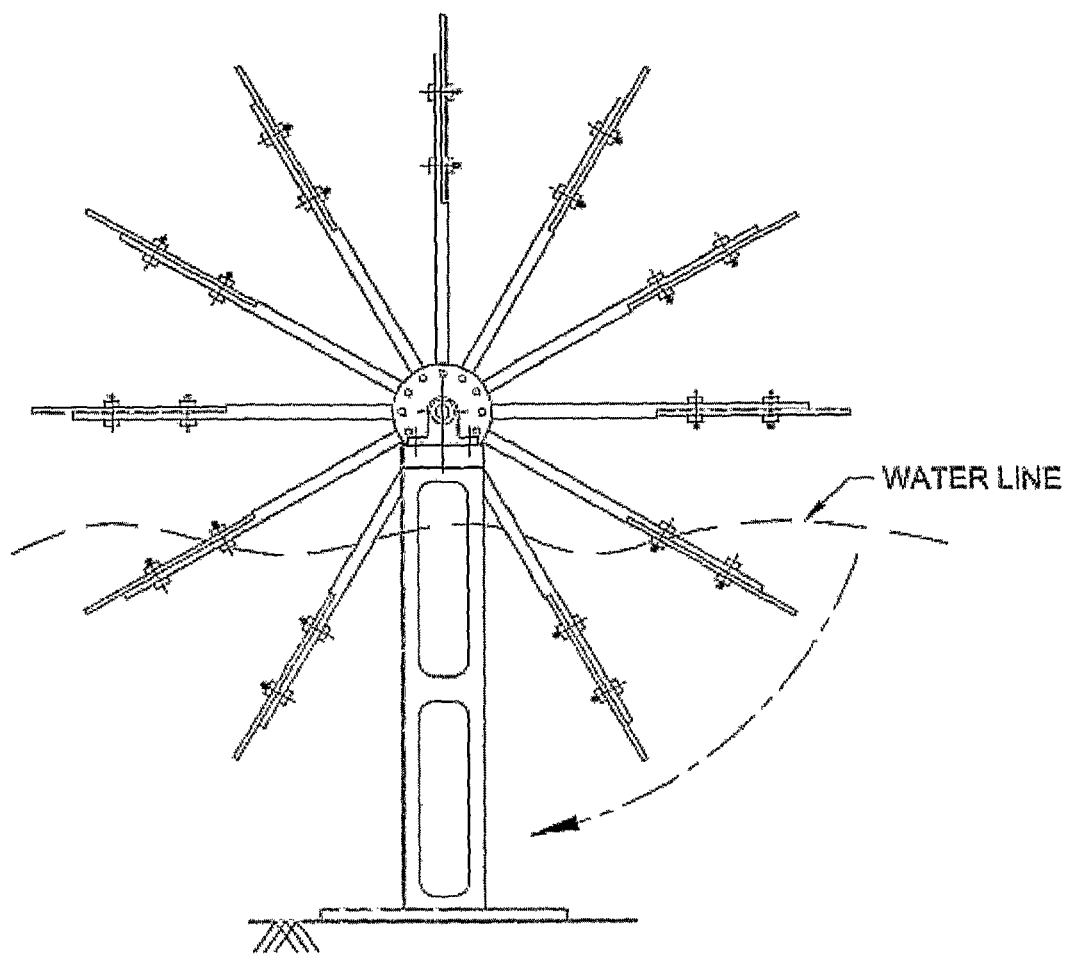
FIG.: 8

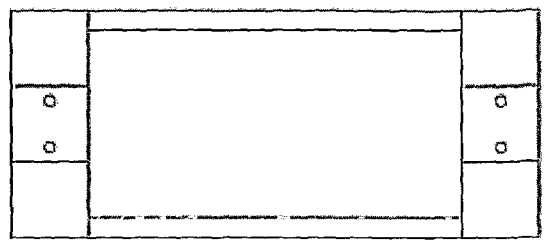
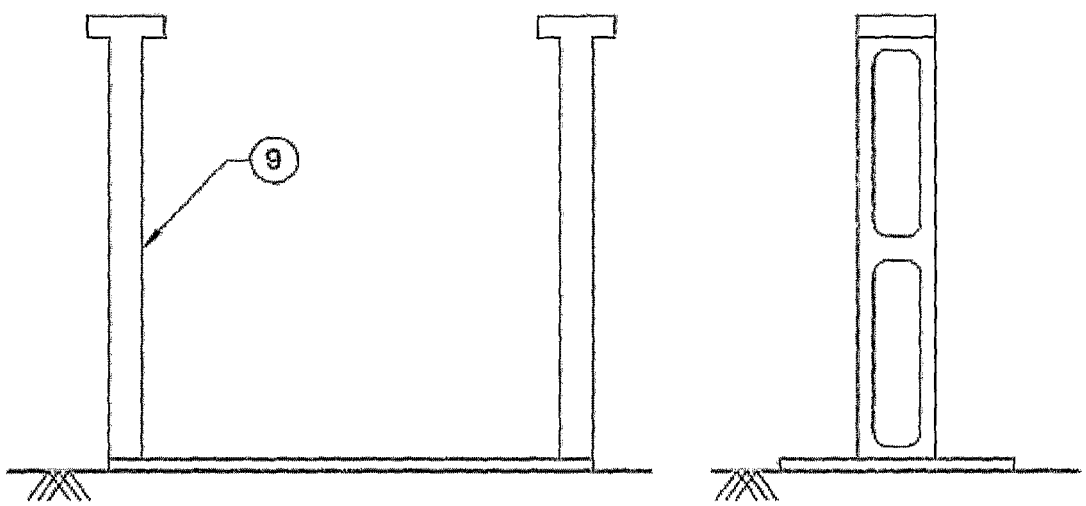
FIG.: 9

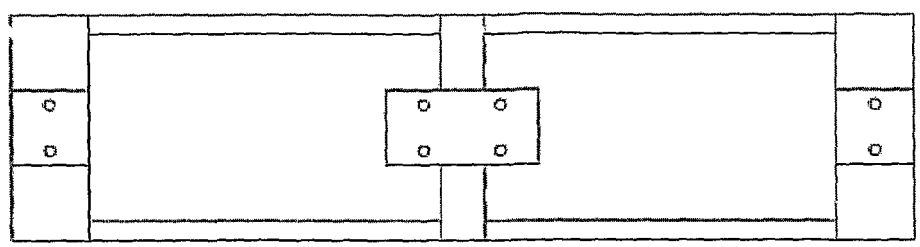
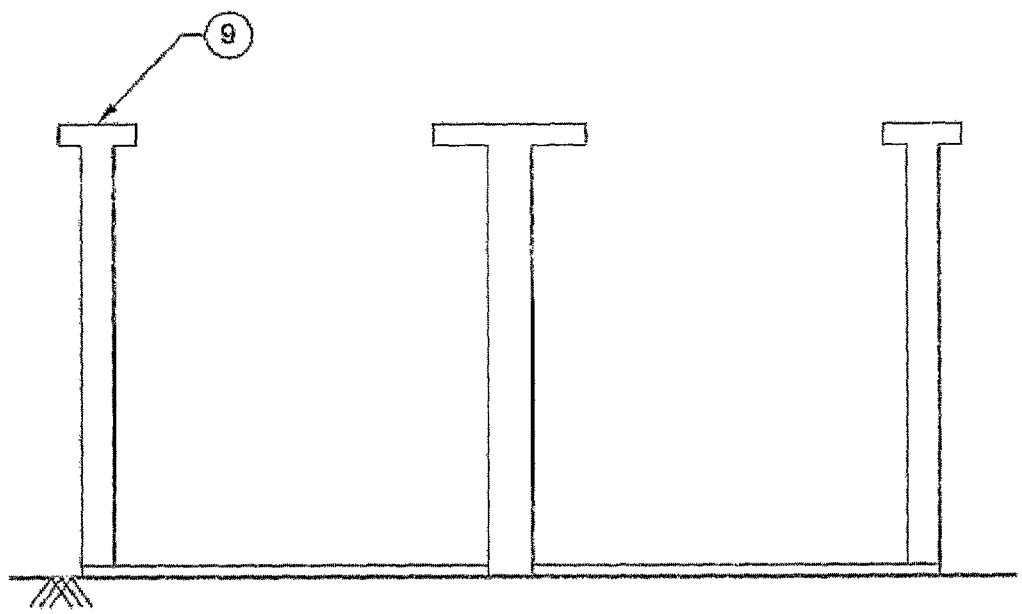
FIG. 10

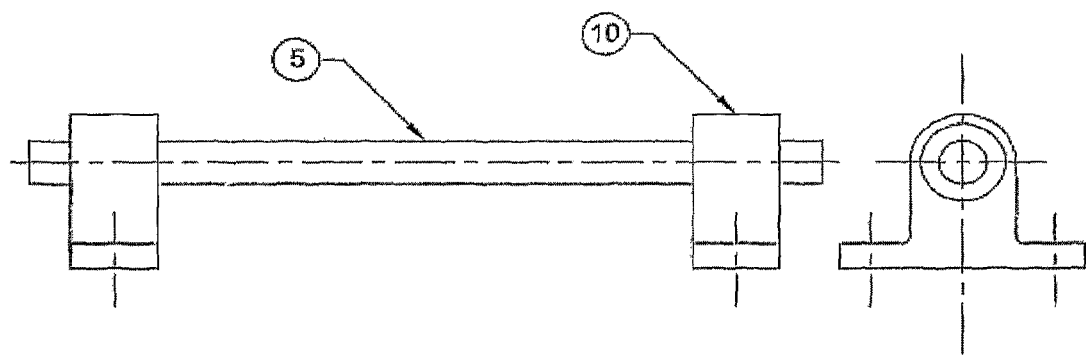
FIG. : 11

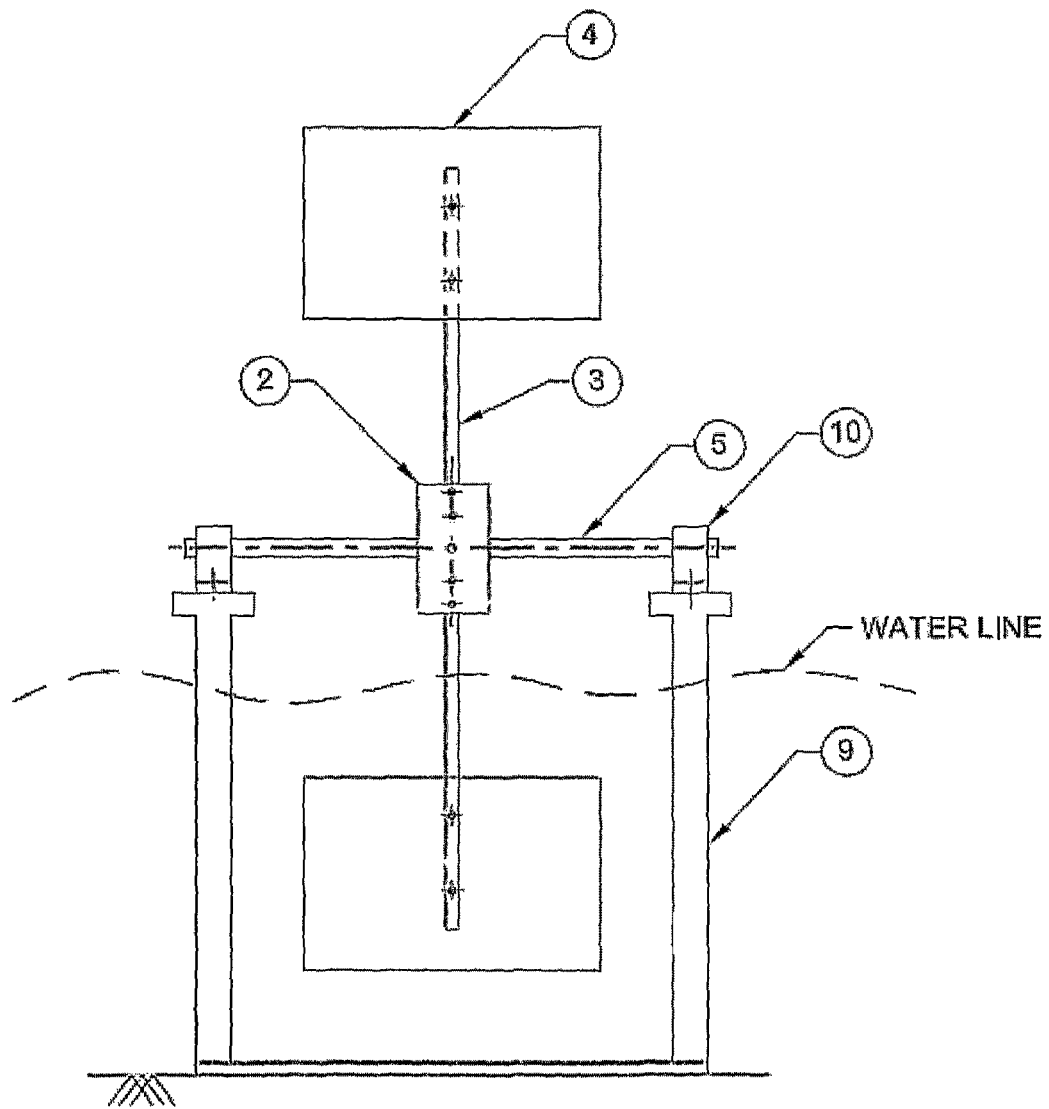
FIG.: 12

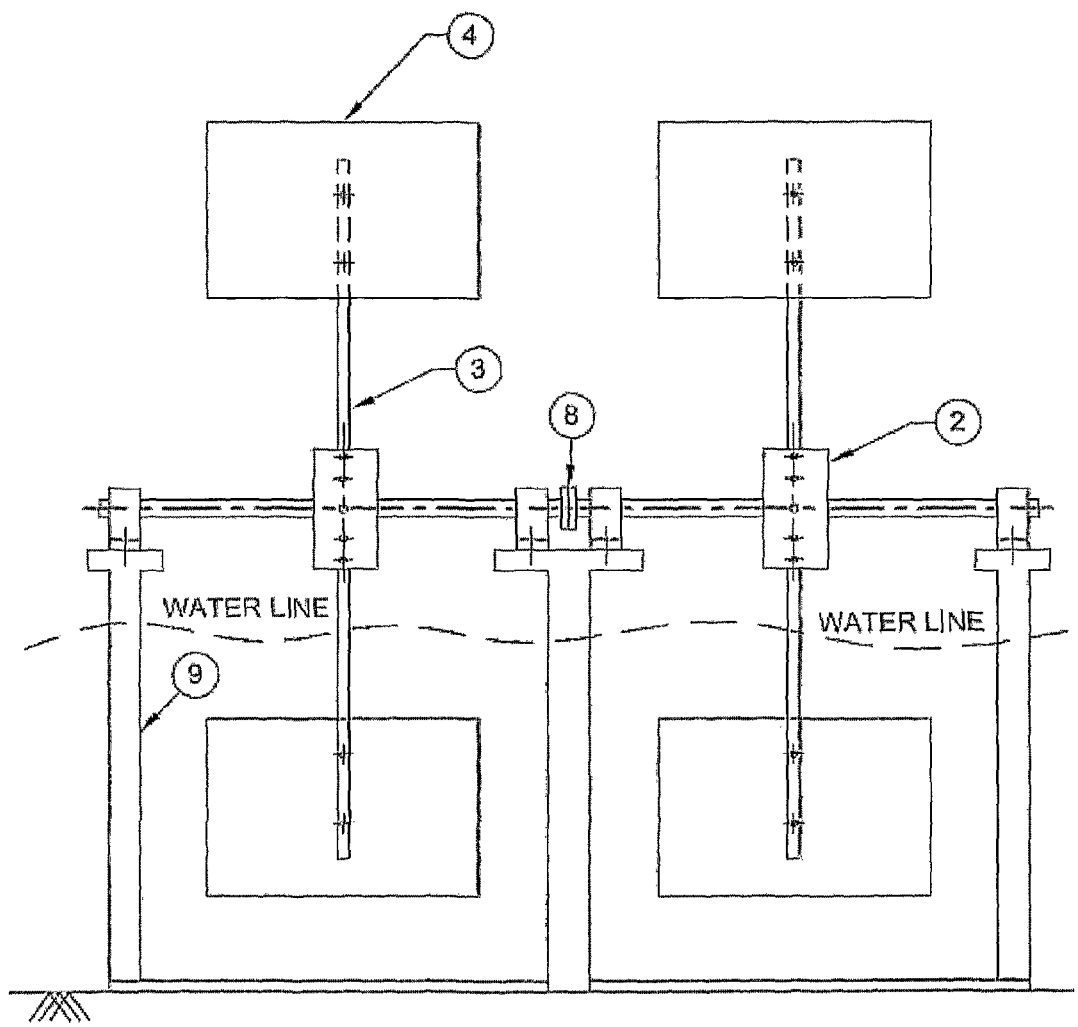
FIG.: 13

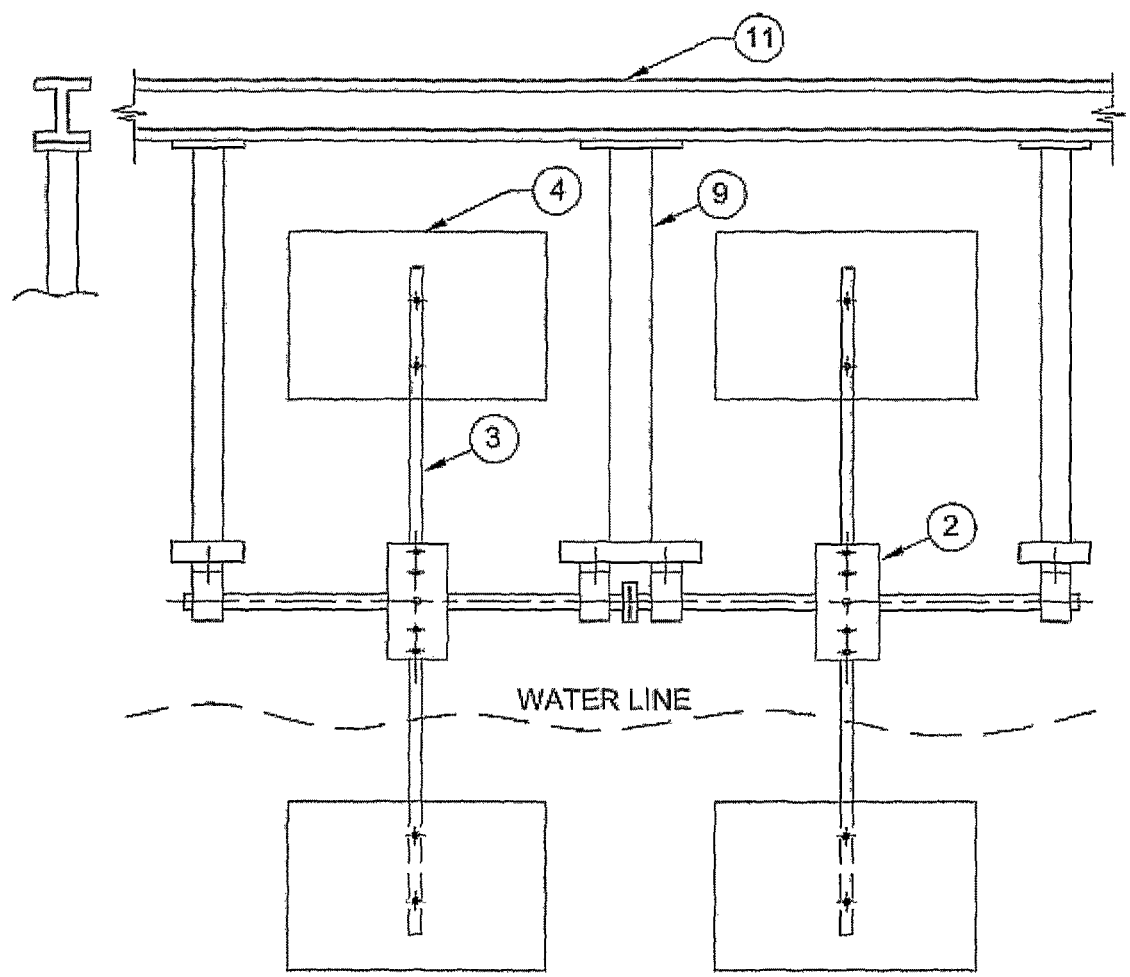
FIG. : 14

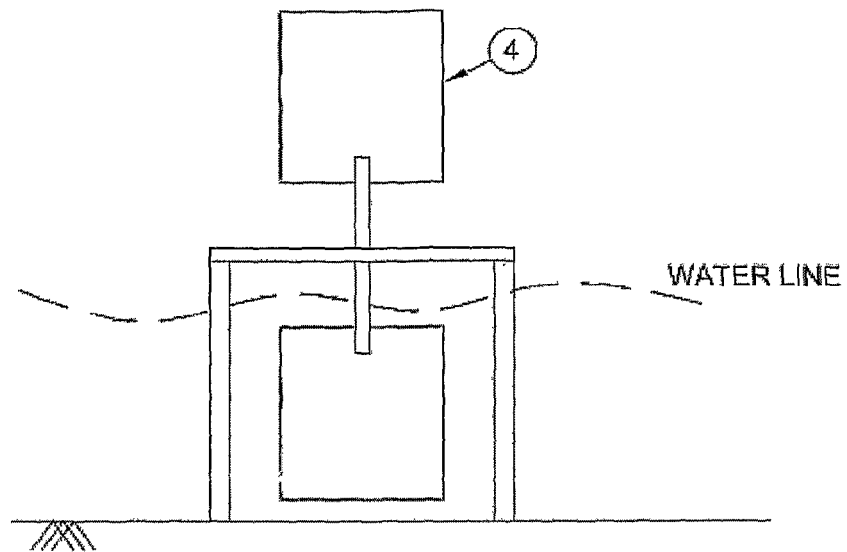
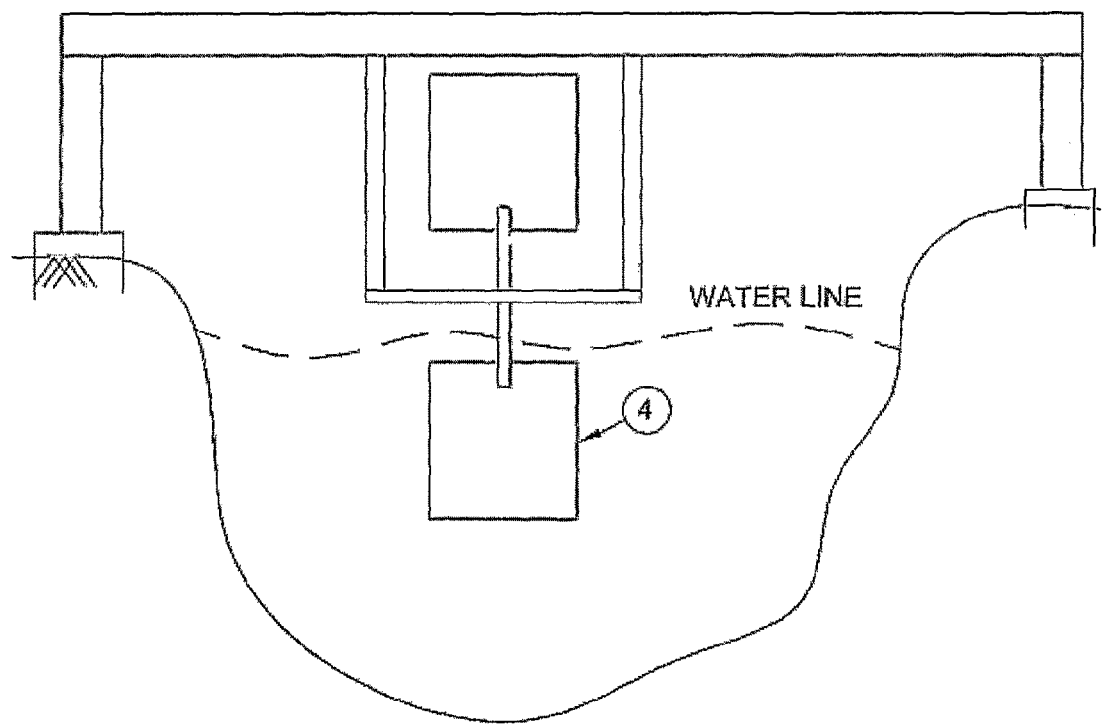
FIG.: 15

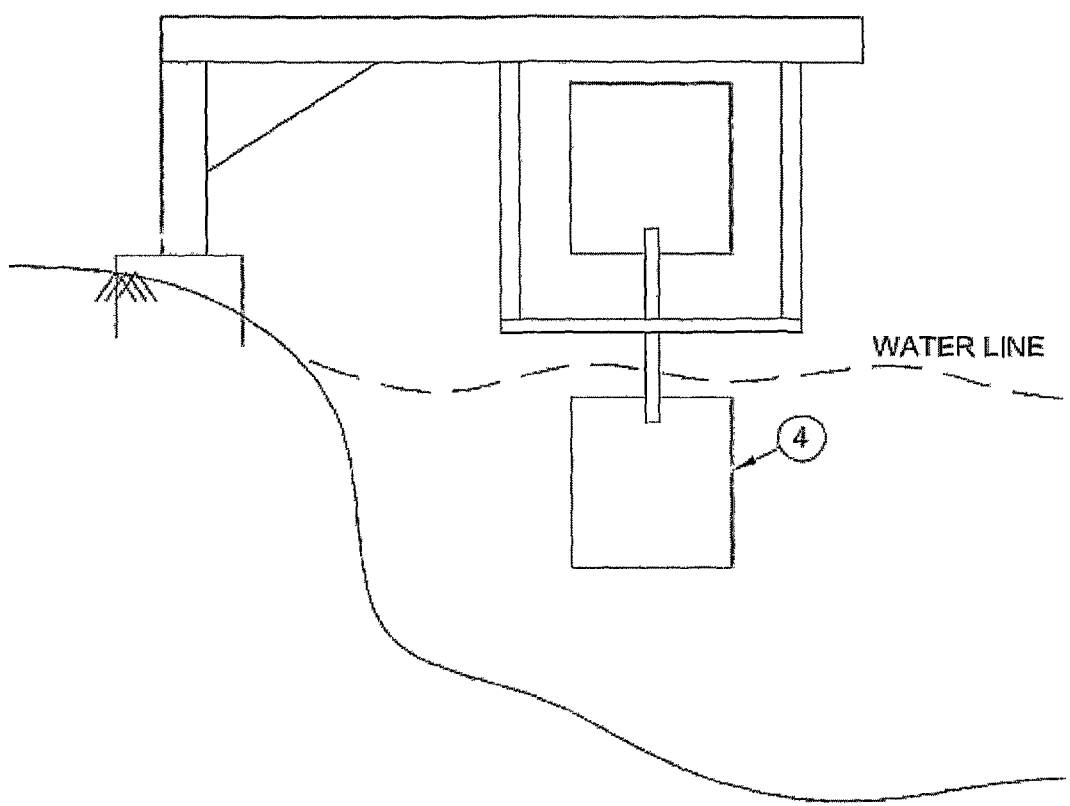
FIG. : 16

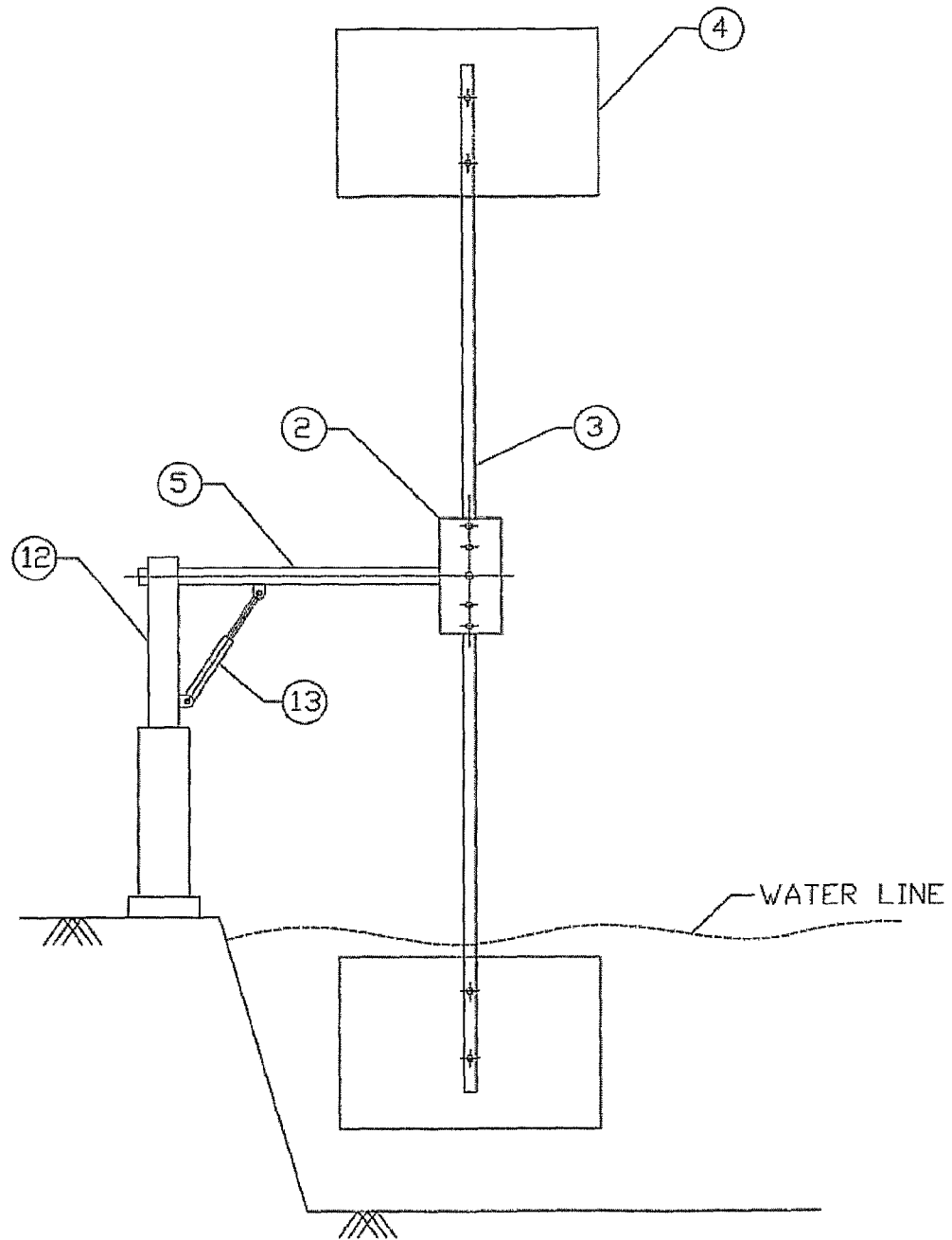
FIG. : 18

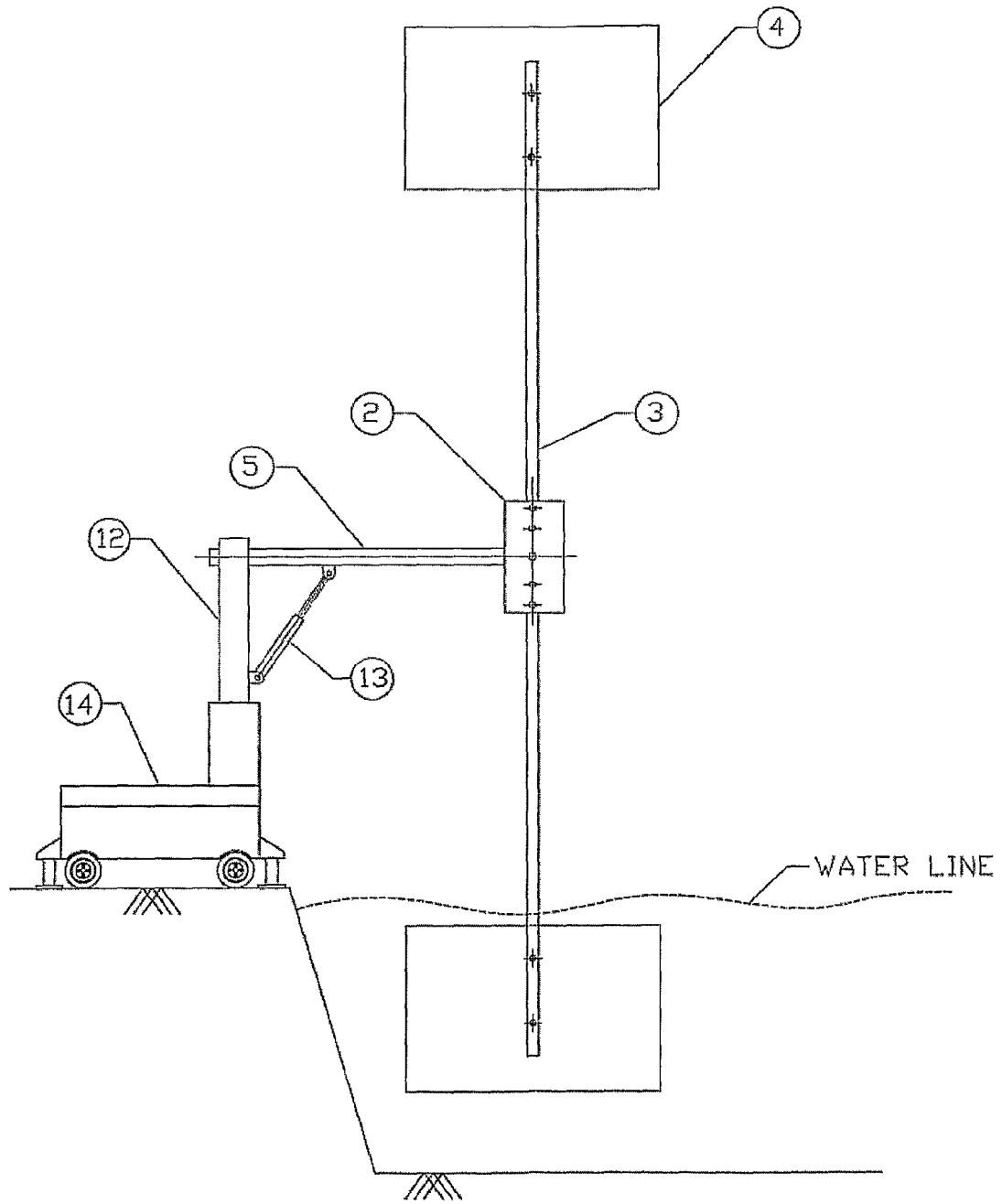
FIG. : 19

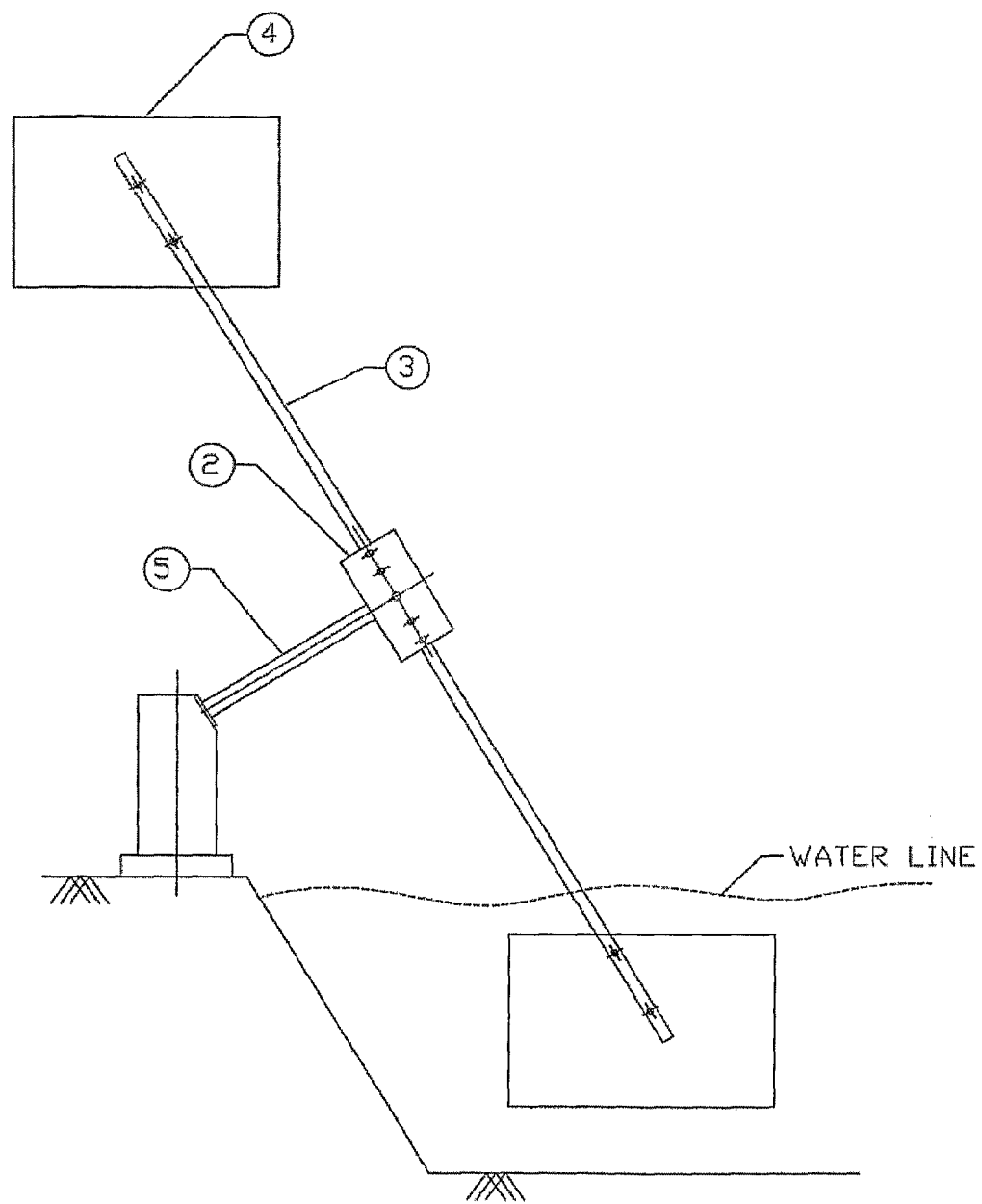
FIG.: 20

SYSTEM FOR GENERATING POWER USING FLOW OF WATER

CROSS REFERENCE TO RELATED APPLICATIONS

This is the U.S. National Stage of International Application No. PCT/IN2008/000764, filed Nov. 11, 2008, which was published in English under PCT Article 21(2), which in turn claims priority from India Patent Application No. 370/MUM/2008, filed Feb. 21, 2008, all of which are incorporated herein by reference.

FIELD OF THE INVENTION

The present invention relates to generation of electrical power. More particularly it relates to electrical power generating system from flow of water by using kinetic energy of flowing water. Most particularly it relates to a system for generating electrical power using flowing water in canals, rivers and the like water streams.

BACKGROUND OF THE INVENTION

There is a great demand of electrical power due to continuous development of civilization and spread of industrialization. Due to difference between its supply and demand, there is always a crisis.

There are mainly three types of electricity generating systems in wide use, which are thermal plants, hydro electricity plants and nuclear plants.

Amongst them, thermal plants are widely used which mainly using fossil fuels such as coals, petroleum products (liquid or gaseous fuels). As known, these fuels are available in limited quantity, which may last in near future. The above-mentioned thermal plants are creating big environmental problems by releasing pollutants in a great amount in the atmosphere. More serious are concerns about the emissions that result from fossil fuel burning. Fossil fuels constitute a significant repository of carbon buried deep under the ground. Burning them results in the conversion of this carbon to carbon dioxide, which is then released into the atmosphere. This results in an increase in the Earth's levels of atmospheric carbon dioxide, which enhances the greenhouse effect and contributes to global warming. Depending on the particular fossil fuel and the method of burning, other emissions may be produced as well. Ozone, sulfur dioxide, $NO_2$ and other gases are often released, as well as particulate matter. Sulfur and nitrogen oxides contribute to smog and acid rain.

Fossil fuels, particularly coal, also contain dilute radioactive material, and burning them in very large quantities releases this material into the environment, leading to low levels of local and global radioactive contamination, the levels of which are, ironically, higher than a nuclear power station as their radioactive contaminants are controlled and stored.

There are some small thermal plants, which may be working on wood and agricultural waste, as a fuel, but these plants are also not environment friendly.

Hydro electricity plants often require the construction of dams, which may result in serious environmental damage. It may involve the serious inundation of large areas of land and the loss of wildlife habitat; an impact on fish breeding; changes in water flow and the river eco-system; changes in sediment and salt contents; and so on.

A further type of electricity generating plants known is nuclear power plant. They are very costly as well as they are quite risky because of radiation leakage being disastrous. A large nuclear power plant may reject waste heat to a natural body of water; this can result in undesirable increase of the water temperature with adverse effect on aquatic life. Moreover, the technology involved in is highly sophisticated.

Thus there is a great need of renewable energy. The mankind needs a source of energy that lasts longer than our limited supply of fossil fuels. Moreover, pollution is also a major issue, where many conscious global citizens and such groups are emphasize on Earth friendly sources of energy.

Due to these all, there are many developments taking place in the areas of Solar Power, Wind Power and Water Power. Solar Power and Wind Power is being used at some places to a limited extent.

As known, there is tremendous kinetic energy in the flowing water. Amongst various existing systems generating energy from water, the most common way of capturing water energy is hydro electrical power i.e. electricity generated by falling of water. There are various drawbacks associated with generation of hydro-electrical power by hydroelectric power scheme such as:
1. It is not environment friendly.
2. The hydroelectric power scheme is generally huge in size and involves excess manpower to operate the same.
3. It involves high cost while their installation as well during maintenance.

Hence it is a need to provide a new system for generation of electrical power, which will be free from all aforementioned problems, which are associated with conventional electrical power generation systems.

OBJECTS OF THE INVENTION

The main object of this invention is to obviate the above mentioned draw backs of all the existing electrical power generating systems and to provide an electrical power generating system which uses flowing water of canals, rivers and like water streams for generating electrical power.

Another object of this invention is to provide a system for generating electrical power using flow of water, which does not create pollution or any adverse effect on environment and also does not generate greenhouse gases.

Yet another object of this invention is to provide a system for generating electrical power using flow of water, which is easy to built, long lasting and well protected against natural calamities such as storms.

Yet another object of this invention is to provide a system for generating electrical power using flow of water, which is comparatively cheaper, where the cost of power generated is minimal and also the power transmission costs and losses can be minimized.

Yet another object of this invention is to provide a system for generating electrical power using flow of water, which can be constructed in easy to assemble modular form thereby increasing or decreasing the area and capacity of the system very easily according to the requirements from time to time or place to place.

Yet another object of this invention is to provide a system for generating electrical power using flow of water, which takes very short period to startup and thereby can begin generating electrical power very speedily.

Still another object of this invention is to provide a system for generating electrical power using flow of water without blocking the navigation, or interrupting the flow river or changing the location of the inter tidal zones and thereby helping in conservation of environment.

Still another object of this invention is to provide a system for generating electrical power using flow of water which is easy to operate and maintain and does not involve any sophisticated technology, machine or other equipment, involving highly skilled specialists for constructing, using or maintaining the system.

SUMMARY OF THE INVENTION

Accordingly to achieve the aforesaid objects present invention provides a system for generating electrical power using flow of water, the system comprising:

plurality of circular structures, each having a bore at the center and plurality of elongated arms being fixed on the outer periphery of said structure;

plurality of blades being fitted on said plurality of elongated arms;

a rotating shaft for rotatably accommodating in space apart relationship said circular structures over outer body of said shaft through said bore;

an electrical generator for converting the mechanical energy generated by rotation of said shaft into electrical energy to produce electrical power; and a transmission device for transmitting the mechanical energy generated by rotation of said shaft from shaft to electrical generator;

Wherein said circular structures along with blades are kept across the flow of water, the blades of said structure get rotation due to force of flowing water and generate energy which rotates said shaft which in turn generate mechanical energy and finally said mechanical energy is transmitted to electrical generator through transmission device for generating electrical power.

BRIEF DESCRIPTION OF THE DRAWINGS

FIG. 5: Shows another perspective view of circular wheel like structure being used in the system for generating electrical power using flow of water in accordance to present invention.

FIG. 6: Shows perspective view of circular wheel like structure shown in FIG. 5 along with blades.

FIGS. 7(a)-7(d): Shows the different forms and views of the blades being used in circular wheel like structures as shown in FIG. 4 and FIG. 6.

FIG. 8: Shows the circular wheel like structure being fixed on the shaft.

FIG. 9: Shows the supporting structure being used in the system for generating electrical power using flow of water in accordance to present invention.

FIG. 10: Shows another supporting structure being used in the system for generating electrical power using flow of water in accordance to present invention.

FIG. 11: Shows yet another supporting structure being used in the system for generating electrical power using flow of water in accordance to present invention.

FIG. 12-17: Shows the different views of arrangement of various parts of the system for generating electrical power using flow of water in accordance to present invention.

FIG. 18: Shows the hydraulic jacking system based supporting structure being used in the system for generating electrical power using flow of water in accordance to present invention.

FIG. 19: Shows the mobile hydraulic jacking system based supporting structure being used in the system for generating electrical power using flow of water in accordance to present invention.

FIG. 20: Shows the system for generating electrical power using flow of water in accordance to the present invention being arranged in inclined plane.

DETAILED DESCRIPTION OF THE INVENTION

The above, and the other objects, features & advantages of invention will become apparent from following description read in conjunction with the accompanying drawings.

Figure 1:
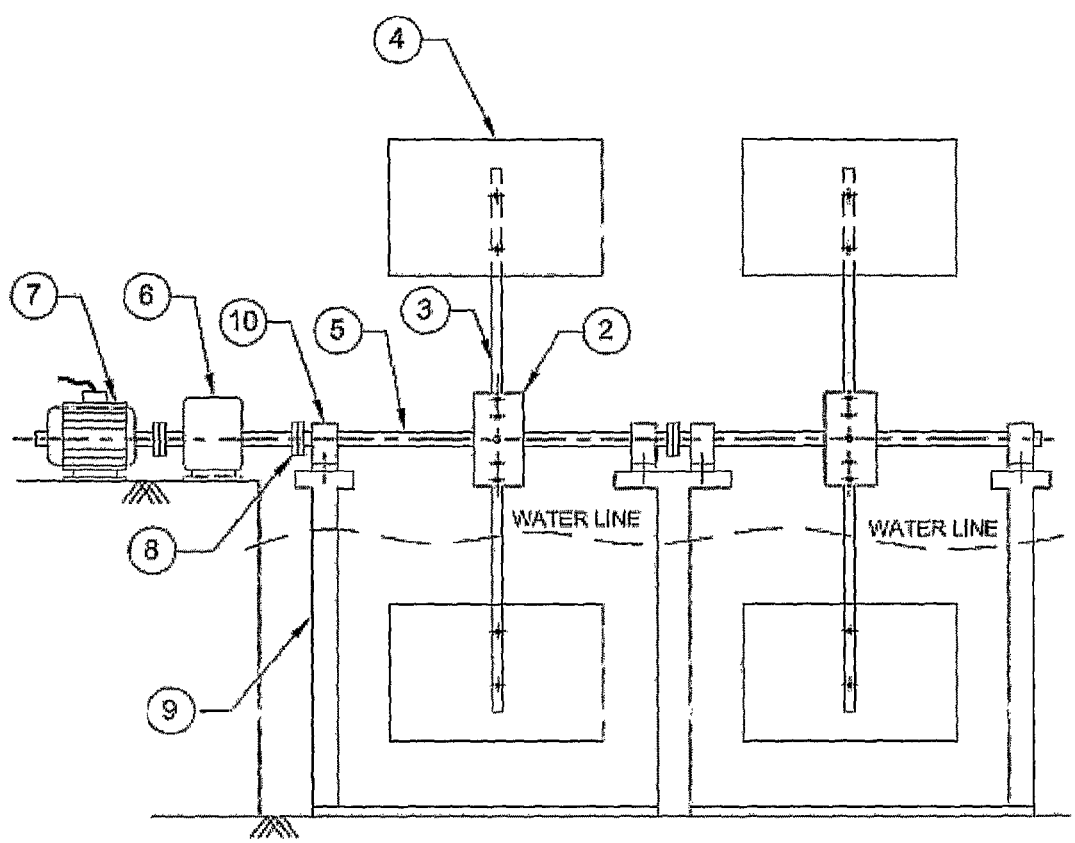
FIG. 1: Shows the system for generating electrical power using flow of water in accordance to the present invention.

FIG. 1 shows schematic assembly diagram of the electrical power generating system (1), by using kinetic energy of water flowing in any water body. The system (1) comprises plurality of circular wheel like structures (2), plurality of blades (4), shaft (5), gearbox (6) and alternator/dynamo (7).

The system (1) consist of plurality of circular wheel like structures (2). Each circular wheel like structure (2) consists of bore (not shown) at the center and plurality of lever arms (3). The lever arms (3) are fixed on the periphery of the circular wheel like structure (2) in space apart relationship. The arms (3) may be permanently fixed or they may be removably fixed on the periphery of the circular wheel like structure (2). Each arm (3) consists of blade (4) being fixed at the free end of arm (3). Different shapes of blades (4) are indicated in FIGS. 7(a)-7(d). Typically blades (4) are rectangular or square in shape with either pointed or curved corners. The curved corners ensure safety of aquatic living creatures. Also this particular shape of blades enhances the performance of the system (1) of the present invention.

The circular wheels like structures (2) are rotatably mounted over rotating shaft (5). Circular wheel like structures (2) are placed on shaft (5) through a bore.

Figure 4:
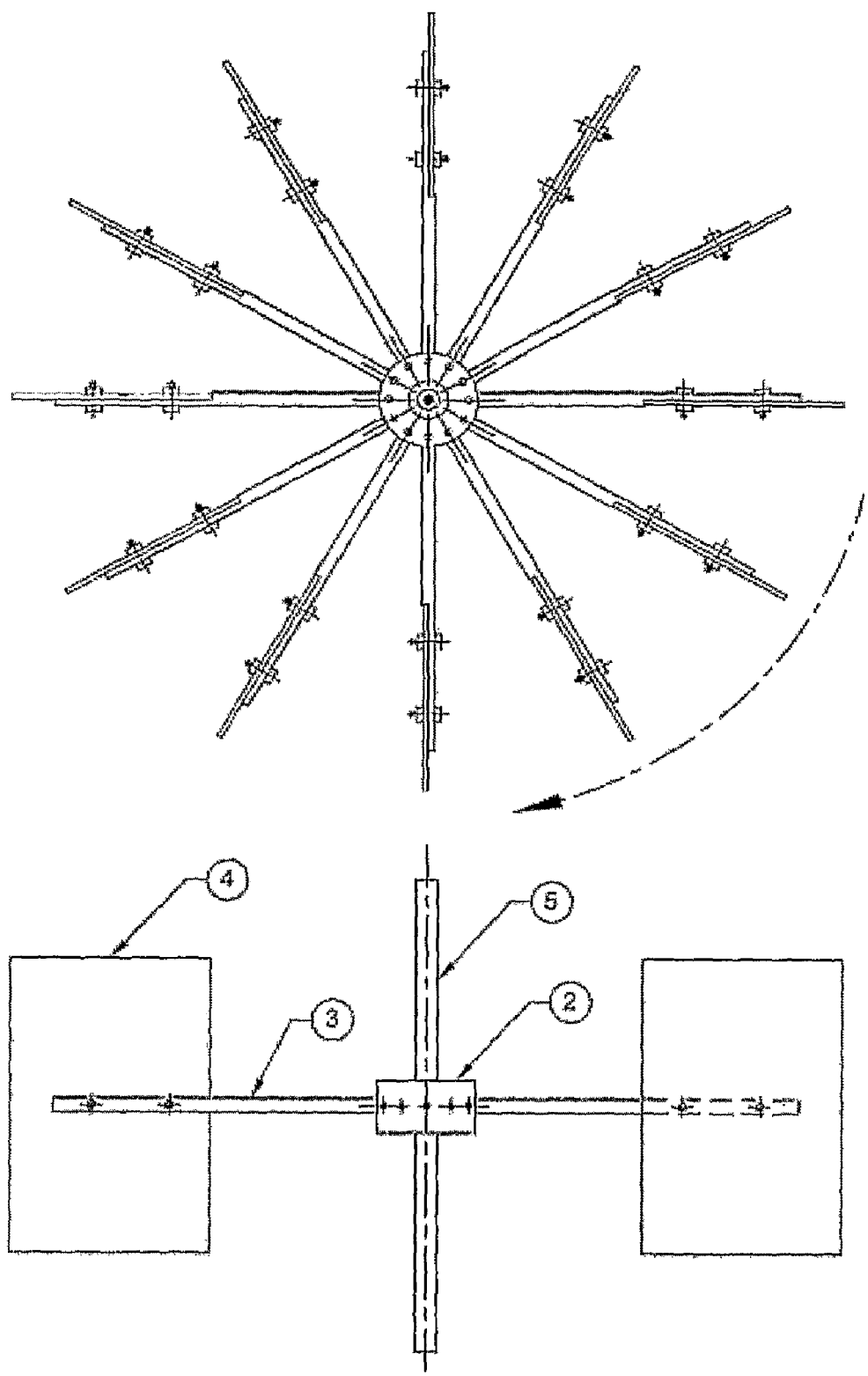
FIG. 4: Shows the perspective view of circular wheel like structure shown in FIG. 3 along with blades.
Figure 16:
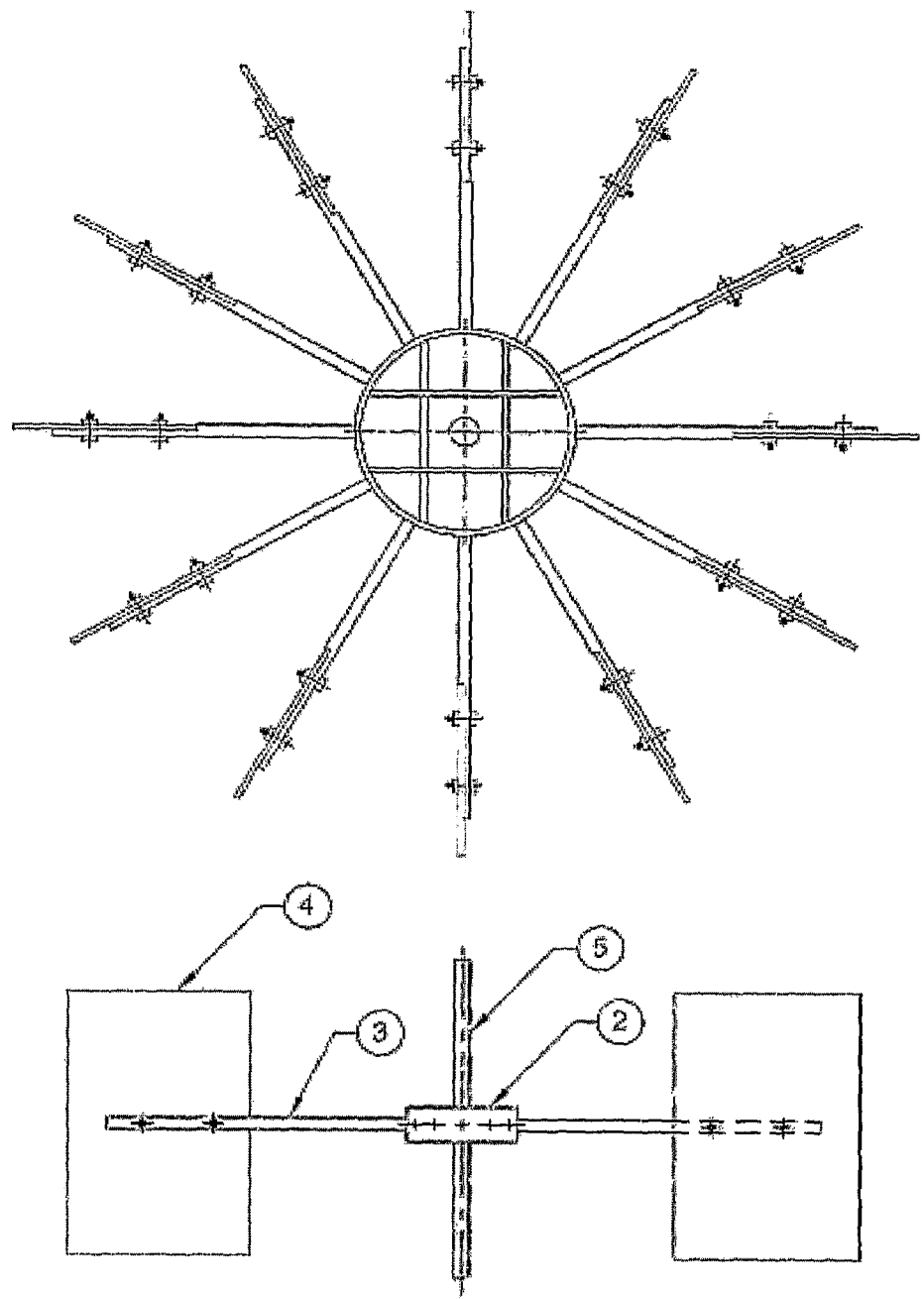
Figure 17:
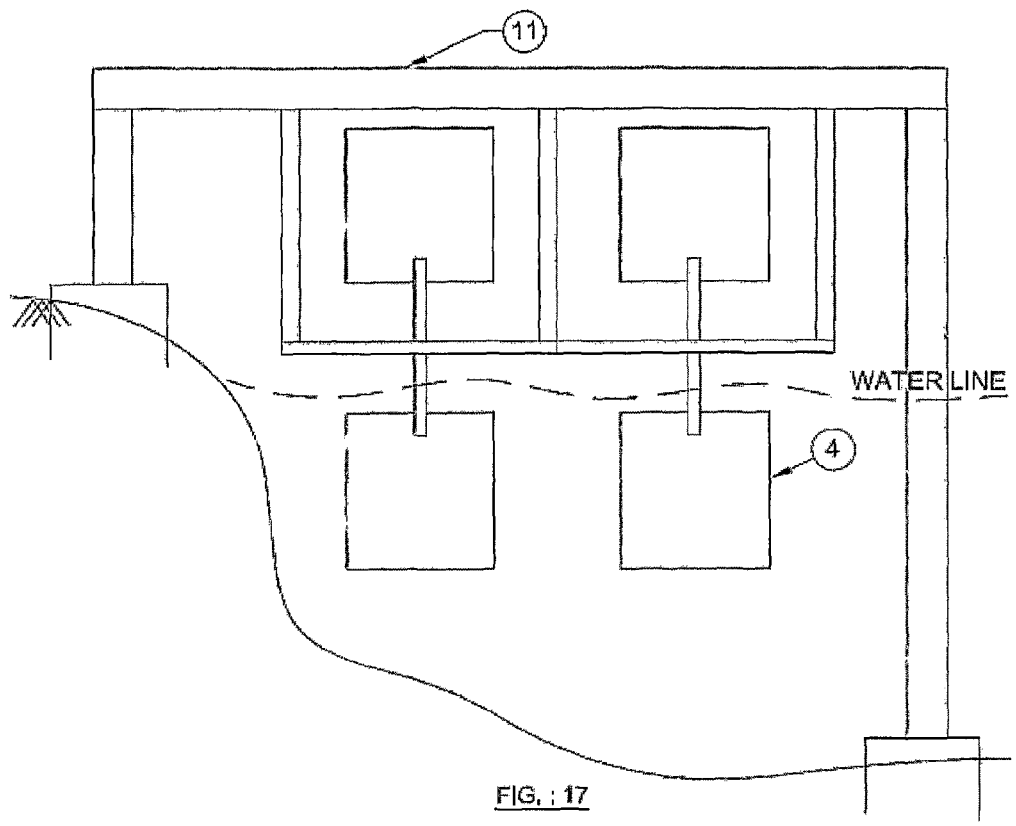

FIG. 4 shows shaft (5) having higher series of bearing blocks (10). This bearing block is like a magnetic bearing, which helps to minimize the friction losses, thus enhanced output of the wheel in terms of mechanical energy. This is not being used by any conventional system.

FIGS. 3-6 show different kind of arrangement of circular wheel like structures (2), which will be used to strengthen the lever arm (3) with blades (4), which can withstand whole structure in case of natural calamities.

FIG. 8 shows partial assembly of number of blades (4) arranged with a lever arm (3) fixed on circular wheel like structure (2). It also shows schematic partial view of the wheel, showing water flow pushing to the blades in single direction allow the blades moving in rotational direction because of velocity of water.

The shaft (5) is connected to alternator/dynamo (7) through a gearbox (6). All these components (5, 6, 7) are connected to each other by using a special kind of coupling (8).

For generating electricity shaft (5) is attached with high ration out put gearbox (6) that converts low RPM of wheel in to required and suitable for alternator/dynamo (7) to generate electricity. This gearbox is also very special type inline planetary gearbox to optimize the output and minimize the friction losses.

Figure 2:
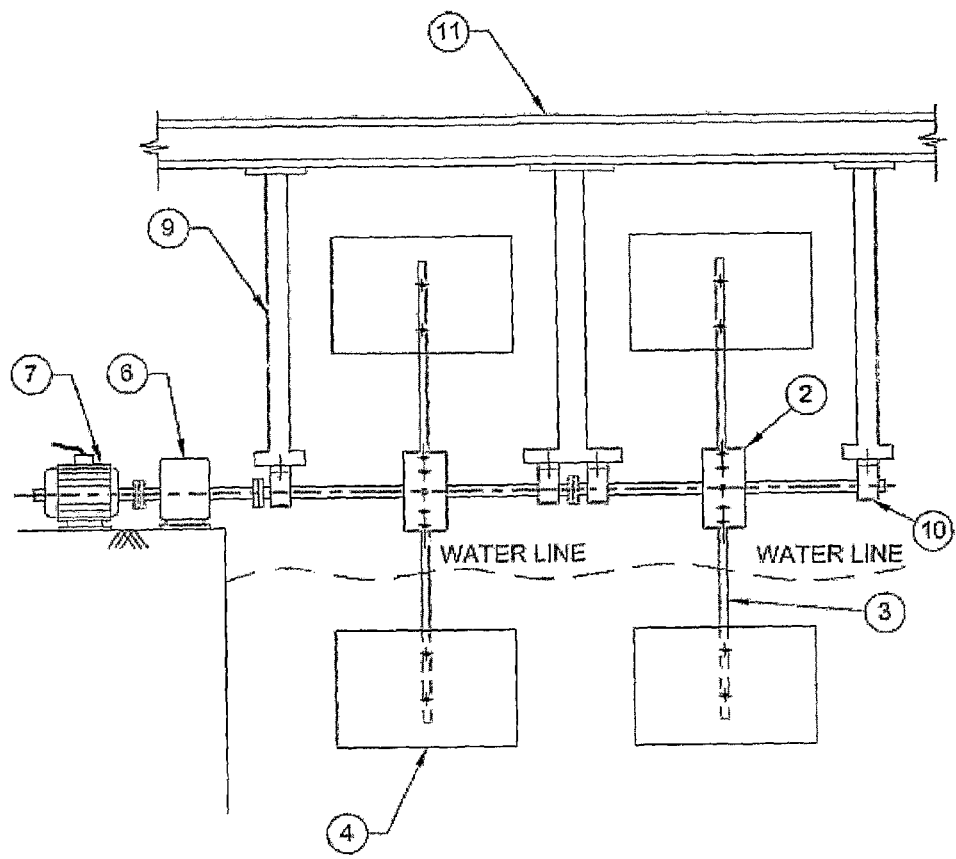
FIG. 2: Shows the system for generating electrical power using flow of water in accordance to another embodiment of the present invention.
Figure 3:
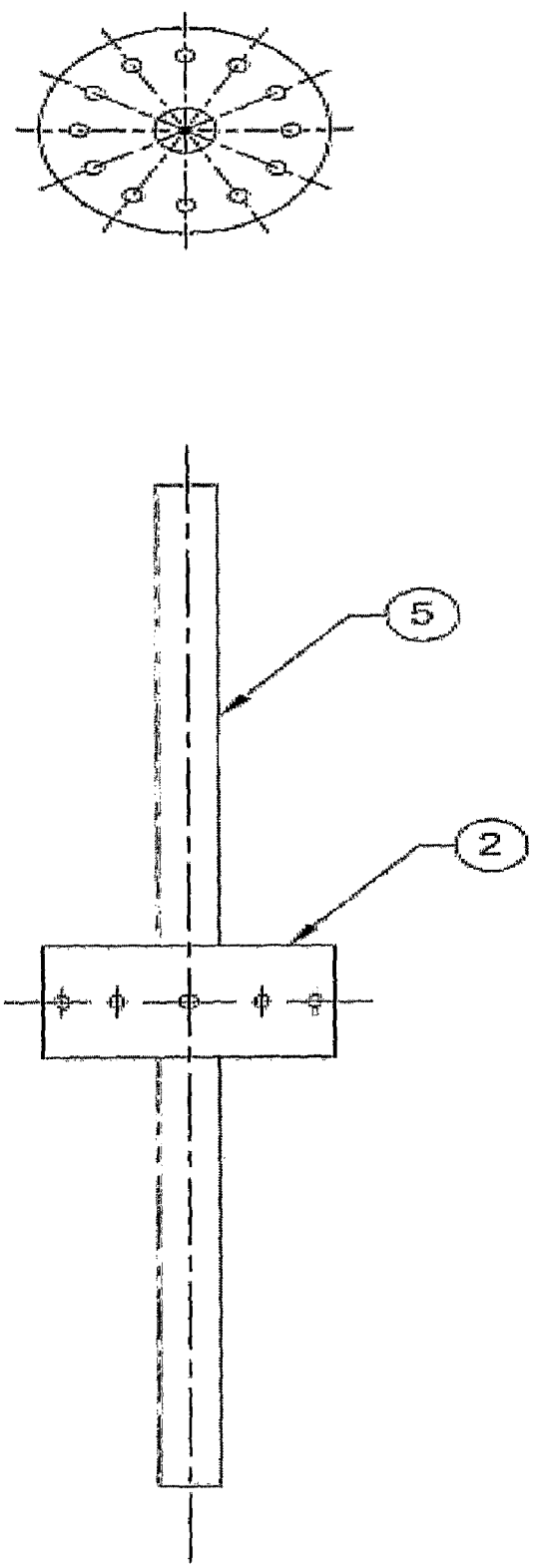
FIG. 3: Shows the perspective view of circular wheel like structure being used in the system for generating electrical power using flow of water in accordance to present invention.

This planetary gearbox offers many advantages as compared to other types of gearbox. Some of them are:
- Higher torque to weight ratio
- High reliability and accuracy
- Low backlash
- Compact size
- Less weight
- High cyclic and radial load carrying capacity
- Improved efficiency
- Modular construction allowing assembly in several stages
- Greater resistance to shock
- Improved lubrication The whole structure of system (1) is supported by two structure pillars (9) build in a water body. Pillar structure (9) may be build outside the water body as shown in FIG. 2). The pillar structure (9) is a RCC/Steel structure and hence remains protected from natural calamities.

Referring to FIG. 18 which shows the hydraulic jacking system based supporting structure being used in the system for generating electrical power using flow of water in accordance to present invention. The supporting structure (12, 13) can be installed at either side of water body without disturbing nature of water body. The supporting structure (12, 13) basically consists of hydraulic jacking system (12, 13) so that when system is not in use it can be isolated from water body. This is useful for at the time of any kind of preventive maintenance.

FIG. 19 again shows same hydraulic jack system based supporting structure with alternative feature of mobility (14) containing hydraulic system inbuilt to get adjustable height depending on the depth of water body. So that the electrical power generating system can easily moved from one place to another place to depending upon the size of the water body and rate of water flowing in water body.

FIG. 20 shows one more alternate electrical power generation system arranged on inclined plane so as to get the maximum benefit of kinetic energy of flowing water available at center portion of water body. This is also featured with tilting arrangement so that when system is not use it can be isolated from water body. This is useful for at the time of any kind of preventive maintenance.

The pluralities of circular wheel like structures (2) are kept across the flow of water. The blades (4) of the structure (2) get rotation due to force of the flowing water. The plurality of the blades (4) when move generate energy which is transmitted to the shaft (5). The shaft (5) which in turn rotates the electric generator/dynamo (7) with the help of gearbox (6). Thus energy of the water flow is converted into electric power by the electric generator/dynamo (7), which is further transmitted with known electrical power transmission system.

As the water continuously flows in water bodies like canal, river and similar, the blades (4) of the system get motion. This continuous motion of plurality of blades leads to generate sufficient electrical energy.

As shown in FIG. 8 more than half of the blades (4) are above the water. And water stuck at the bottom of the blade. Upper blades are always remaining in the air. And as we know air has less friction than water. So it will decreases friction loss due to water when we put the all the blade in the water. And there by increase efficiency. And we can use the flow of energy.

The system (1) is preferably made up of lightweight corrosion proof material/metals or is provided with anti corrosive treatment/painting or coating so as to provide long shelf life.

The diameter of the shaft (5), the length of the lever arm (3) and the length of the blade, width of the blade and depth of the blade is according to the desired output of the plant. The system can be constructed in a desired dimensions depending upon the capacity required. Water flow study of various can be carried out to design a plant. For better performance, length and width of the blade should be of sufficient range such that a kinetic energy of available water flow can be converted in to electrical energy with optimum output.

The system (1) can be made in modular form and a number of modules can be connected as per requirement and width of the water body. The distance between the two structures is kept according to the width of the system. The structures are kept longitudinally parallel to water flow. The output of the system can be multiplied proportionately by installing numbers of circular wheel like structures (2) in a series or a parallel mode. Power generated by such a numbers of circular wheel like structures (2) can be diverted in to nearest available power transmission line or power grid.

ADVANTAGES OF THE SYSTEM OF THE PRESENT INVENTION i. The system produces continuous electric power, which can be further transmitted with minimal losses.
ii. The system is easy to build on flow of water such as canals, rivers, and like.
iii. The system uses water which is renewable energy source and which is available free.
iv. This system is relatively cheap as it does not involve very huge and cumbersome construction on water flow.
v. The system involves very low maintenance.
vi. The system is environment friendly as it uses flow of water and therefore does not consume limited fossil fuels or pollute the atmosphere with combustion gases.

INDUSTRIAL APPLICABILITY

Unlike conventional coal-fired power stations, which take hours to start up, the system of present invention can begin generating electricity very speedily. So the system is particularly useful for responding to sudden increases in the demand for electricity by customers. Moreover, there is an unlimited scope of installation of the proposed invention on canals, rivers and similar in the entire world. Hence we can meet with power demand and can accelerate the development.

The present invention is not limited to the above-described embodiments, and various alterations, modifications, and/or alternative applications of the invention may be possible, if desired, without departing from the scope and spirit of the invention, which can be read from the claims and the entire specification. All these possible alterations, modifications, and/or alternative applications of the invention are also intended to be within technical scope of the present invention.

The invention claimed is:
1. A system for generating electrical power using flowing water, the system comprising:
one or more circular structures, each having a central bore and a plurality of elongated arms being fixed on an outer periphery of said structure;
a plurality of blades being fitted on said plurality of elongated arms;
a rotating shaft for rotatably accommodating in spaced apart relationship said one or more circular structures over an outer body of said shaft through said bore;
an electrical generator for converting mechanical energy generated by rotation of said shaft into electrical energy to produce electrical power; and a transmission device for transmitting the mechanical energy generated by rotation of said shaft from said shaft to said electrical generator;

wherein said one or more circular structures along with said blades are configured to be positioned at least partially in flowing water with said shaft in an inclined position, such that said one or more circular structures rotate about said shaft due to force of flowing water and generate mechanical energy which rotates said shaft which in turn transmits said mechanical energy to said electrical generator through said transmission device for generating electrical power.

2. The system of claim 1, wherein said elongated arms are removably fitted on the outer periphery of said structure.

3. The system of claim 1, wherein said elongated arms are permanently fitted on the outer periphery of said structure.

4. The system of claim 1, wherein said blades are removably fitted on said elongated arms.

5. The system of claim 1, wherein said blades are permanently fixed on said elongated arms.

6. The system for generating electrical power using flow of water as claimed in of claim 1, wherein said electrical generator comprises an alternator.

7. The system of claim 1, wherein said transmission device comprises a gearbox.

8. The system of claim 7, wherein said gearbox comprises a planetary gearbox.

9. The system of claim 1, further comprising supporting means for providing support to said shaft, said electrical generator and said transmission device above a surface of said flowing water.

10. The system of claim 9, wherein said shaft is supported on said supporting structure through bearing blocks.

11. The system of claim 10, wherein said bearing blocks comprises a magnetic bearing.

12. The system of claim 1, wherein said one or more circular structures along with said blades are configured to be positioned at least partially in flowing water with said one or more circular structures in an inclined position.

13. The system of claim 12, wherein said shaft and said one or more circular structures along with said blades are suspended from only one end of said shaft by a support structure configured to be positioned on one shore of the flowing water.

14. A system for generating electrical power using flowing water, the system comprising:
one or more circular structures, each having a central bore and a plurality of elongated arms being fixed on an outer periphery of said structure;
a plurality of blades being fitted on said plurality of elongated arms;
a rotating shaft for rotatably accommodating in spaced apart relationship said one or more circular structures over an outer body of said shaft through said bore;
an electrical generator for converting mechanical energy generated by rotation of said shaft into electrical energy to produce electrical power; and
an inline planetary gearbox for transmitting the mechanical energy generated by rotation of said shaft from shaft to said electrical generator;

wherein said one or more circular structures along with said blades are configured to be positioned at least partially in flowing water, such that said one or more circular structures rotate about said shaft due to force of flowing water and generate mechanical energy which rotates said shaft which in turn transmits said mechanical energy to said electrical generator through said inline planetary gearbox for generating electrical power.

15. A system for generating electrical power using flowing water, the system comprising:
one or more circular structures, each having a central bore and a plurality of elongated arms being fixed on an outer periphery of said structure;
a plurality of blades being fitted on said plurality of elongated arms;
a rotating shaft for rotatably accommodating in spaced apart relationship said one or more circular structures over an outer body of said shaft through said bore;
a hydraulically operated supporting structure for supporting said rotating shaft;
an electrical generator for converting mechanical energy generated by rotation of said shaft into electrical energy to produce electrical power; and
a transmission device for transmitting the mechanical energy generated by rotation of said shaft from shaft to said electrical generator;
wherein said one or more circular structures along with said blades are configured to be positioned at least partially in flowing water, such that said one or more circular structures rotate about said shaft due to force of flowing water and generate mechanical energy which rotates said shaft which in turn transmits said mechanical energy to said electrical generator through said transmission device for generating electrical power.

16. The system of claim 15, wherein said hydraulically operated supporting structure is fixed on a support surface outside the flowing water.

17. The system of claim 15, wherein said hydraulically operated supporting structure is movable along a support surface outside the flowing water.

18. The system of claim 15, wherein said shaft is positionable in an inclined position.

19. The system of claim 15, wherein said hydraulically operated supporting structure is configured to adjust the height of said shaft relative to a support surface.

20. The system of claim 15, wherein said shaft is pivotable between a first position wherein at least one of said blades is in the flowing water and a second position wherein none of said blades are in the flowing water.

* * * * *